United States Patent [19]

Bilsky et al.

[11] 4,313,078
[45] Jan. 26, 1982

[54] BATTERY CHARGING SYSTEM

[75] Inventors: Herbert W. Bilsky, Lawrenceville, N.J.; Patrick J. Callen, Yardley, Pa.

[73] Assignee: RCA Corporation, New York, N.Y.

[21] Appl. No.: 100,455

[22] Filed: Dec. 5, 1979

[51] Int. Cl.³ .............................................. H02J 7/00
[52] U.S. Cl. ..................................... 320/15; 136/292; 320/37; 320/43; 323/906
[58] Field of Search ................................. 320/22-24, 320/37, 38, 39, 40, 43, 44, 15; 307/41; 323/906; 136/292

[56] References Cited

U.S. PATENT DOCUMENTS

| 3,409,815 | 11/1968 | Wright et al. | 320/37 X |
| 3,426,263 | 2/1969 | Hennigan et al. | 320/40 X |
| 3,867,681 | 2/1975 | Bishop et al. | 320/37 X |
| 4,016,474 | 4/1977 | Mason | 320/38 X |
| 4,210,854 | 7/1980 | Godard | 320/37 X |

OTHER PUBLICATIONS

"Alkaline Secondary Cells", Wm. W. Jakobl, Gould-National Batt. Inc., 1965, pp. 207, 208.

Primary Examiner—Robert J. Hickey
Attorney, Agent, or Firm—Samuel Cohen; Robert L. Troike; Christopher L. Maginniss

[57] ABSTRACT

A highly efficient battery charging system in which the ampere-hour discharge of the battery is sensed for controlling the battery charging rate. The battery is charged at a relatively high charge rate during a first time period proportional to the extent of battery discharge and at a second lower rate thereafter.

3 Claims, 5 Drawing Figures

BATTERY CHARGING SYSTEM

This invention relates to rechargeable battery power systems. More particularly, the invention relates to such systems especially designed for use in environments such as in satellites, requiring efficient use of electrical power.

Satellites often employ solar cell arrays as the primary power source. This power is used to operate spacecraft subsystems such as, thermal, telemetry, and attitude control, etc., and the satellite payload such as communications, navigation, scientific, meteorological, etc. equipment. A solar cell array delivers power during the time it is illuminated by sunlight but since the satellite also requires power when the array is dark, rechargeable batteries are provided as a secondary power source.

A battery charging system should include provisions for an efficient charging regime, narrow temperature control limits during the charging, and means to prevent unplanned for depth-of-discharge of the batteries even under failure mode conditions. In conventional battery charging subsystems one or more of these elements may not be present and this shortens the useable life of the rechargeable batteries.

In one conventional prior art battery charging system, the battery is charged at a relatively low charge rate C/20, where C is the capacity of the battery in amperehours. At this rate, the charging current is 0.85 amperes for a 17 ampere-hour battery and requires up to 20 hours to charge from a fully discharge state. The power used to charge each battery is 28 watts or 112 watts for a four battery system. Towards the end of the charge period, the batteries approach the fully charged state and approximately all the charge power delivered to the battery results in heat dissipation. During the charge period, the heat dissipation varies according to the state of the charging battery. The variation is in the order of 0-112 watts. Unless the heat generated is removed from the battery, the temperature of the batteries will increase in the order of 25° C. to 30° C. Such a temperature increase will have an adverse effect on life of the battery whose desirable temperature range is 0° C. to 10° C.

In a system embodying the invention, a system for charging a battery includes means responsive to its ampere-hour discharge for producing a control signal indicative of the amount of such discharge and charging means responsive to said control signal for charging said battery at a relatively high rate for a time period dependent on the value of said control signal and for then charging said battery at a relatively lower charge rate.

Figure 1:
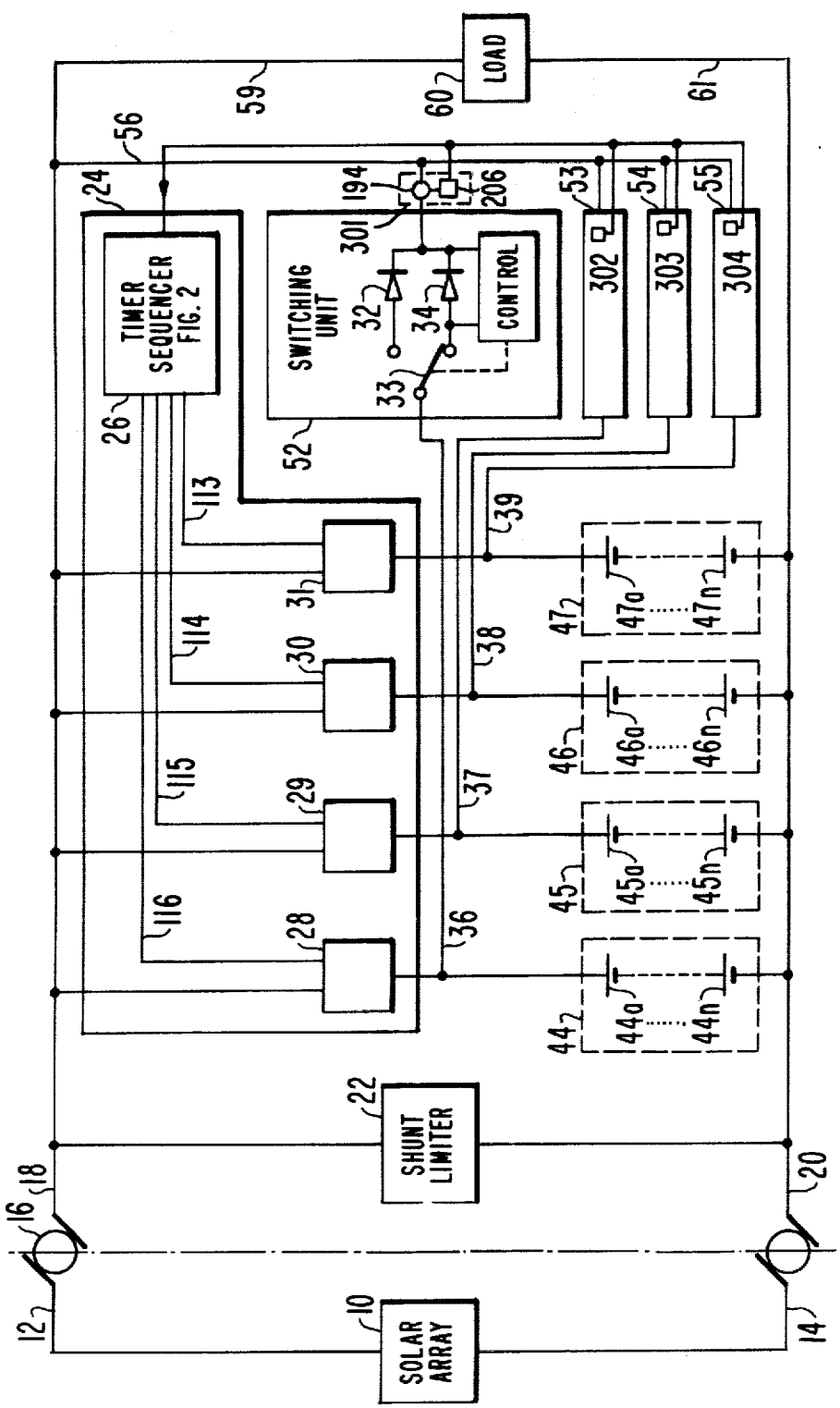
FIG. 1 is a block and schematic diagram of a preferred embodiment of a battery charging system embodying the invention.

FIG. 1, illustrates, by way of example, the components of a satellite borne battery system. The energy for recharging a secondary power source, comprising a plurality of battery cells to be discussed, is supplied from a solar array 10, a slip-ring assembly 16, and a shunt limiter 22. These are common items in satellites. The array 10 supplies for a typical satellite example, approximately 14.3 amperes for transfer to the shunt limiter 22 which, in turn, limits the voltage to 35 volts. The solar array 10 transfers the current to the shunt limiter 22 via buses 12 and 14, slip-ring assembly 16 and buses 18 and 20. The shunt limiter 22 which may for example be a zener diode, clamps the voltage maximum at 35 volts. The current is applied to a plurality of battery cells, shown in FIG. 1 as four groups 44a . . . 44n, 45a . . . 45n, 46a . . . 46n, and 47a . . . 47n, via the buses 18 and 20 and a battery charging assembly 24. It should be understood that the invention is not limited to four groups of battery cells. The number of groups of battery cells is preferably determined by the power and redundancy required by the satellite subsystems. The battery cells are typically of the nickel-cadmium (Ni-Cd) type. Battery cells 44a . . . 44n, 45a . . . 45n, 46a . . . 46n, and 47a . . . 47n, will hereinafter be referred to as batteries 44, 45, 46, and 47, respectively. Each battery 44, 45, 46, and 47 is for the example, comprised of 22 cells.

Battery charger assembly 24 comprising battery chargers 28, 29, 30, and 31 and timer sequencer 26, is connected to batteries 44, 45, 46, and 47. Batteries 44, 45, 46, and 47 are respectively connected to battery chargers 28, 29, 30, and 31. Timer sequencer 26 as will be explained hereinafter controls the sequence of charging of the batteries and the charging rate of the battery chargers 28, 29, 30 and 31 via signals paths 116, 115, 114 and 113 respectively.

The output of battery chargers 28, 29, 30 and 31 are connected to switching units 52, 53, 54 and 55 and batteries 44, 45, 46, and 47 respectively. Batteries 44, 45, 46, and 47 are connected, via switching units 52, 53, 54, and 55 respectively, to the satellite subsystems represented as a load 60 connected across paths 59 and 61 and having a value of for example, 500 watts. The bias voltage across diodes 32 or 34, contained within each switching unit 52, 53, 54, and 55 determines if the batteries 44, 45, 46, and 47 are electrically coupled to load 60. For example, when the voltage across battery 44, which is connected to the anode of either diode 32 or 34 of switching unit 52, is greater than the voltage across the load 60 which is connected to the cathode of diodes 32 and 34, then diode 32 or 34 is forward biased and battery 44 is electrically coupled to load 60.

Ampere-hour sensors 301 thru 304 located at the output of each switching unit 52, 53, 54, and 55 sense the ampere-hours (capacity) removed from the batteries 44, 45, 46, and 47, respectively. Referring in particular to switching unit 52, the battery 44 is coupled to the load 60 via current sensor 194 of ampere-hour sensor 301, switch 33 and either diode 34 or diode 32. Diode 32 is switched in circuit in responsive to a failure signal detected across the diode 34. The current sensor 194 may be a small valued sensing resistor in series between the battery and the load and thereby provide a voltage signal thereacross indicative of current. This voltage signal taken across the series resistor is time integrated when the battery is in use in an integrator 206 (also part of the ampere-hour sensor 301) to provide a signal indicative of the ampere-hour discharge of battery 44. The integrator 206 for example, comprises an analog-todigital converter the output of which is clocked at, for example, a once per minute rate into an accumulator to thereby provide a digital signal representing ampere-minutes. The accumulator accumulates the output from the converter for the total time period the batteries are used to provide a binary signal representing the ampere-hour discharge of the battery 44. Similarly, the sensors 302, 303 and 304 of switching units 53, 54, and 55 sense the ampere-hour discharge of the batteries 45, 46, and 47. The signal from each sensor representative of the amount of discharge from each battery is applied to the timer sequencer 26. Also a ground station may receive this integrated voltage from the accumulator via a satellite telemetry system. In this case, a signal based on the ampere-hour delivered from the batteries is generated at the ground station and transmitted to the satellite (more particularly the sequencer) via the telemetry system.

Figure 2:
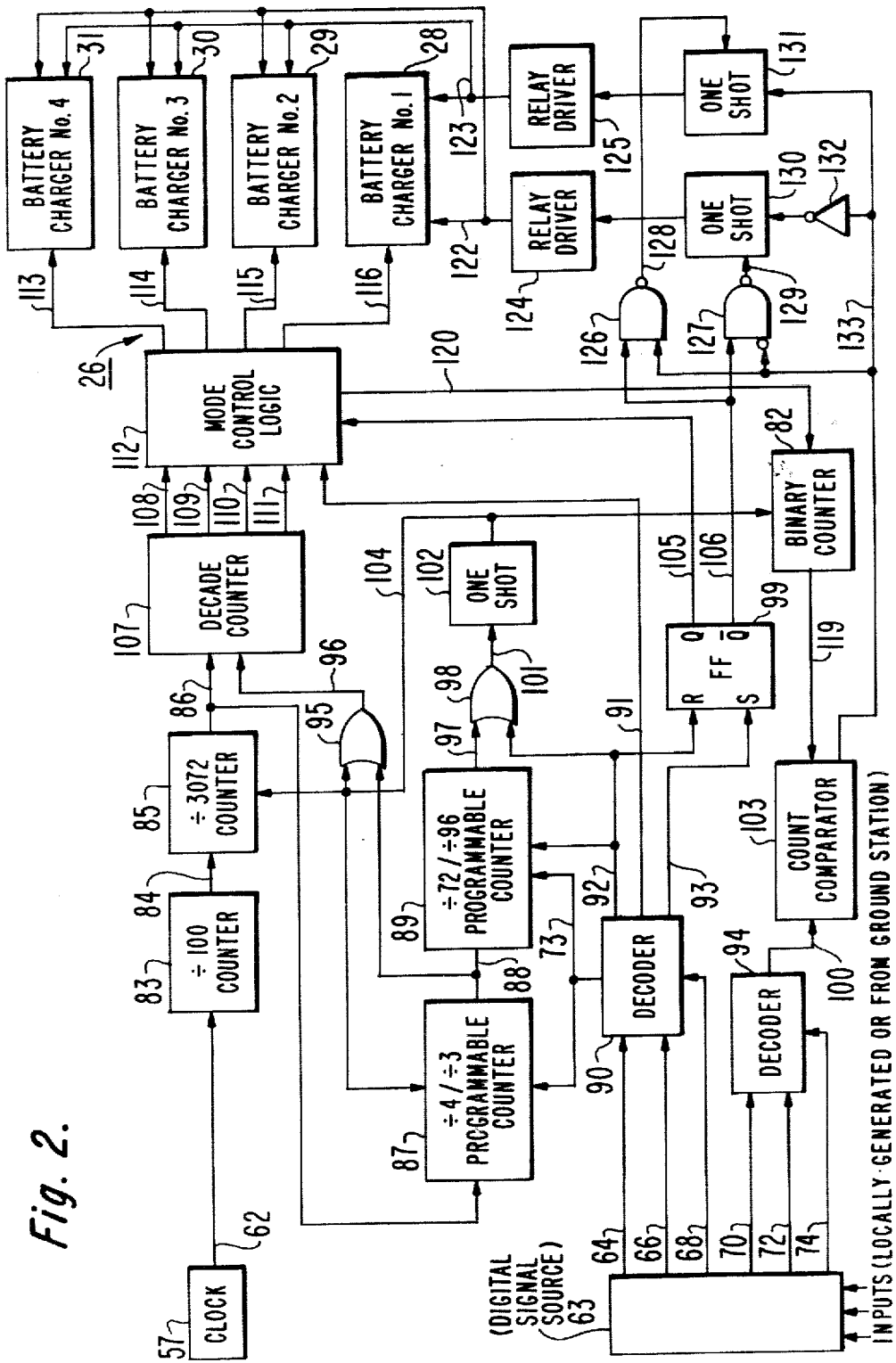
FIG. 2 is a block diagram of the timer sequencer shown in FIG. 1.

Reference is now made to FIG. 2 for details of timer sequencer 26. Timer sequencer 26 shown in FIG. 2 is a digital device whose operation is controlled by a clock source 57 and digital information supplied from signal source 63. The signal source 63 may be responsive to signals sent from a ground station, locally generated signals, or to signals sent directly from the accumulators in ampere-hour sensors 301 through 304. The signal source 63 is also responsive to other input signals which represent the particular batteries to be charged or not charged and whether the system is in the manual or automatic modes.

The clock source 57 supplies clock pulses via path 62 to counter 83. These pulses may be at a frequency of, for example, 1024 Hz. The counter 83 divides the clock frequency 1024 Hz by a factor of 100. The output of counter 83 is connected to a further step-down counter 85 which divides the counter 83 output frequency by a factor 3072. The resulting division by 100 and 3072 develops a signal on signal path 86 that recurs at a time interval of once per 5 minutes hereinafter referred to as a 5 minute pulse. Signal path 86 is connected to a decade counter 107, to be described hereinafter, and a programmable counter 87. Counter 87 is programmable by a digital input, to be described hereinafter, to provide either a divide by 4 or divide by 3 division of the 5 minute pulse present on signal path 86. The division by four or by three provides a signal on path 88 that recurs at time intervals of once per 20 minutes or once per 15 minutes respectively. The pulses on path 88 occurring once every 20 or 15 minutes will hereinafter be referred to as the 20 and 15 minute pulses. The signals from counter 87 are applied to an OR circuit 95 and a second programmable counter 89. Programmable counter 89 is programmable by a digital input, to be described hereinafter, and provides either a divide by 72 division of the 20 minute pulse or a divide by 96 division of the 15 minute pulse, both divisions resulting (with the appropriate counter 87 division) a pulse occurring once per 24 hours at the output of counter 89 on signal path 97. The pulse on signal path 97 will hereinafter be referred to as the 24 hour pulse. The 5 minute pulse, the 20 minute and 15 minute pulse and the 24 hour pulse provide the desired time-based signals for the synchronous operation of the timer sequencer 26.

Source 63 provides on signal path 64 a digital word having digital information typically in the form of logic "1" and "0" that are coincident with a so-called "strobe" pulse provided by source 63 in signal path 66. This digital word represents the number and the batteries to be charged whether or not the system is in the automatic or manual mode. The digital information on signal path 64 and the strobe pulse on path 66 are applied to a decoder 90. In addition to the digital information on paths 64 and 66, decoder 90 is supplied from the source 63 via lead 68 with digital information representing execute commands. Source 63 may receive these command signals from a ground station or they may be locally generated. The signal representing the number of batteries to be charged may be selected manually by selecting one of a plurality of positions of a switch. The positions may be to all batteries, not battery 1, not battery 2, not battery 3, not battery 4, or manual. The switch positions may set or reset a series of flip-flops to produce the binary word. This binary word may be produced automatically by translating to a binary word the ampere-hours sensed by the sensors. If for example, battery 1 was not discharged a "not battery 1" code with the automatic mode signal is generated. Decoder 90 decodes the digital information on paths 64, 66 and 68 and generates four output signals: (1) mode select signal on signal path 91, (2) automatic mode signal path 92, (3) manual mode signal on signal path 93, and (4) a selection word on path 73 that determines the aforementioned division ratios of programmable counters 87 and 89. The mode select signal selects which batteries are to be charged. The automatic mode or manual mode signal selects manual or automatic sequence operation. The selection word on path 73 determines if programmable counter 87 is divide by 4 or 3 to generate a 20 or 15 minute pulse and also if programmable counter 89 is to divide by 72 or 96 to provide the 24 hour pulse.

Source 63 produces binary digital command signals which represent the number of high rate charge cycles (at for example, a C/7.5 rate) required to replace the capacity removed from the batteries during the discharge time period, thereafter the rate of charge is reduced to a lower value (for example, to a C/30 rate). Source 63 may produce the binary digital command signals by being simply a conductor coupling binary signals from the accumulator of one of the ampere-hour sensors (301 through 304 FIG. 1) to the output of source 63. Source 63 may also be a satellite receiver for receiving the command signals from a ground station transmitter as mentioned previously. The command signals from the ground station are responsive to the signals from the ampere-hour sensors 301 through 304.

The digital information relating to the number cycles at the high charge rate is supplied to decoder 94 of timer sequencer 26, via the signal paths 70, 72, and 74. The digital information present on signal paths 70, 72 and 74 is similar to the digital information previously described on signal paths 64, 66, and 68, respectively. Decoder 94 decodes the binary signals indicative of the number of cycles at the C/7.5 rate for example, to replace the capacity removed. Decoder 94 generates an output signal on path 100 to a counter comparator 103 containing a preset value to be described hereinafter, representing the number of cycles the batteries 44, 45, 46, and 47 to be charged at a C/7.5 rate before being automatically switched to a C/30 rate. Charging rates of C/7.5 and C/30 represent charging current for the charging of batteries 44, 45, 46, and 47 of 2.27 and 0.567 amperes, respectively, for a typical battery having a capacity of 17 ampere-hours. Once the digital information has been stored in counter comparator 103 and programmable counters 87 and 89, the preset values of the timer sequencer 26 are established and the sequencer 26 then operates in a sequential manner.

The decade counter 107, of timer sequencer 26 counts the 5 minute pulses present on signal path 86 to generate four sequential output signals, spaced from each other by a 5 minute duration, on paths 108, 109, 110 and 111. Similarly, the mode control logic 112, as will be discussed hereinafter, generates four output inhibit signals on paths 113, 114, 115 and 116 that are connected to battery chargers 31, 30, 29, and 28 respectively. Mode control logic 112 further generates a signal on path 120 once every 15 or 20 minutes.

The decade counter 107 is periodically reset by the 20 or 15 minute pulse, the 24 hour pulse and the automatic mode signal present on signal path 96. The 20 or 15 minute pulse is routed to signal path 96 from counter 87 via signal path 88 and OR circuit 95. The 24 hour pulse is routed to signal path 96 via the output of counter 89, signal path 97, OR circuit 98, signal path 101, one-shot 102, signal path 104 and OR circuit 95. The automatic mode signal on path 92 is routed to signal path 96 via the output of decoder 90 via signal path 92, the prior mentioned OR circuit 98, signal path 101, one-shot 102, signal path 104 and OR circuit 95. The 24 hour pulse and the automatic mode signal on path 92 resets counters 82, 85 and 87 via paths 104. The automatic mode signal on path 92 also resets counter 89.

The automatic mode signal on path 92 is further routed to the reset input (R) of flip-flop (FF) 99 causing the $\bar{Q}$ output of FF 99 to be active. The $\bar{Q}$ output of flip-flop 99 is connected via path 105 to the inputs of NAND gates 126 and 127. The inputs of NAND gates 126 and 127 have a further connection from the output of count comparator 103 via path 133. The occurrence of a high level signal at $\bar{Q}$ output of flip-flop 99, typically in the order of 10 volts for example on path 105 and a high level signal on path 133 from comparator 103 representing a C/7.5 charging rate, causes NAND gate 126 to generate a low signal typically in the order of zero (0) volts, on path 128 to one-shot 131. This low signal allows one-shot 131 to be triggered by the high signal from count comparator 103 via path 133. Activating one-shot 131 activates relay driver 125 to establish the C/7.5 charging rate. Thus, the C/7.5 charging rate is established upon the occurrence of the automatic mode select signal on signal path 92. To simplify the discussion hereinafter, when referring to a high signal it is understood that a typical voltage of 10 volts is referred to and also when referring to a low signal it will be understood that 0 volts is being referred to.

Relay driver 125 remains activated until the output signal from counter comparator 103 on path 133 changes from a high signal to a low signal. A low signal on path 133 now causes NAND gate 126 to generate a high reset signal on path 128 which, in turn, deactivates relay driver 125 via one-shot 131. A low signal on path 133 also causes NAND gate 127 to generate a low set signal on path 129, which with a high trigger signal present at the output of INVERTER 132, activates the one-shot 130. The activation of one-shot 130 causes relay driver 124 to be activated and establish the C/30 charging rate. Thus, the transition of the output from a high to a low signal of counter comparator 103 occurring on path 133 causes the charging rate to transfer from C/7.5 to C/30.

Counter comparator 103 compares two digital values, (1) the preset value on path 100 supplied from a decoder 94, and (2) the output of quantity of binary counter 82 present on path 119. The decoder signal at decoder 94 represents the number of cycles of the high charge rate which is determined by the signal from source 63 and from sensors 301 through 304. When the count value on path 119 from binary counter 82 equals the value on path 100, the output of counter comparator 103 transfers from a high to a low signal, which, in turn, causes the charging rate to change from C/7.5 to C30. Binary counter 82 counts and accumulates the occurrences of the 15 or 20 minute pulses present on the output path 120 of mode control logic 112. Thus, counter comparator 103 changes the charging rate from C/7.5 to C/30 when the total occurrences of the 15 or 20 minute pulses equal a predetermined value established by the digital signal supplied from source 63 and is a function of the ampere-hours or capacity taken from the batteries.

Figure 3:
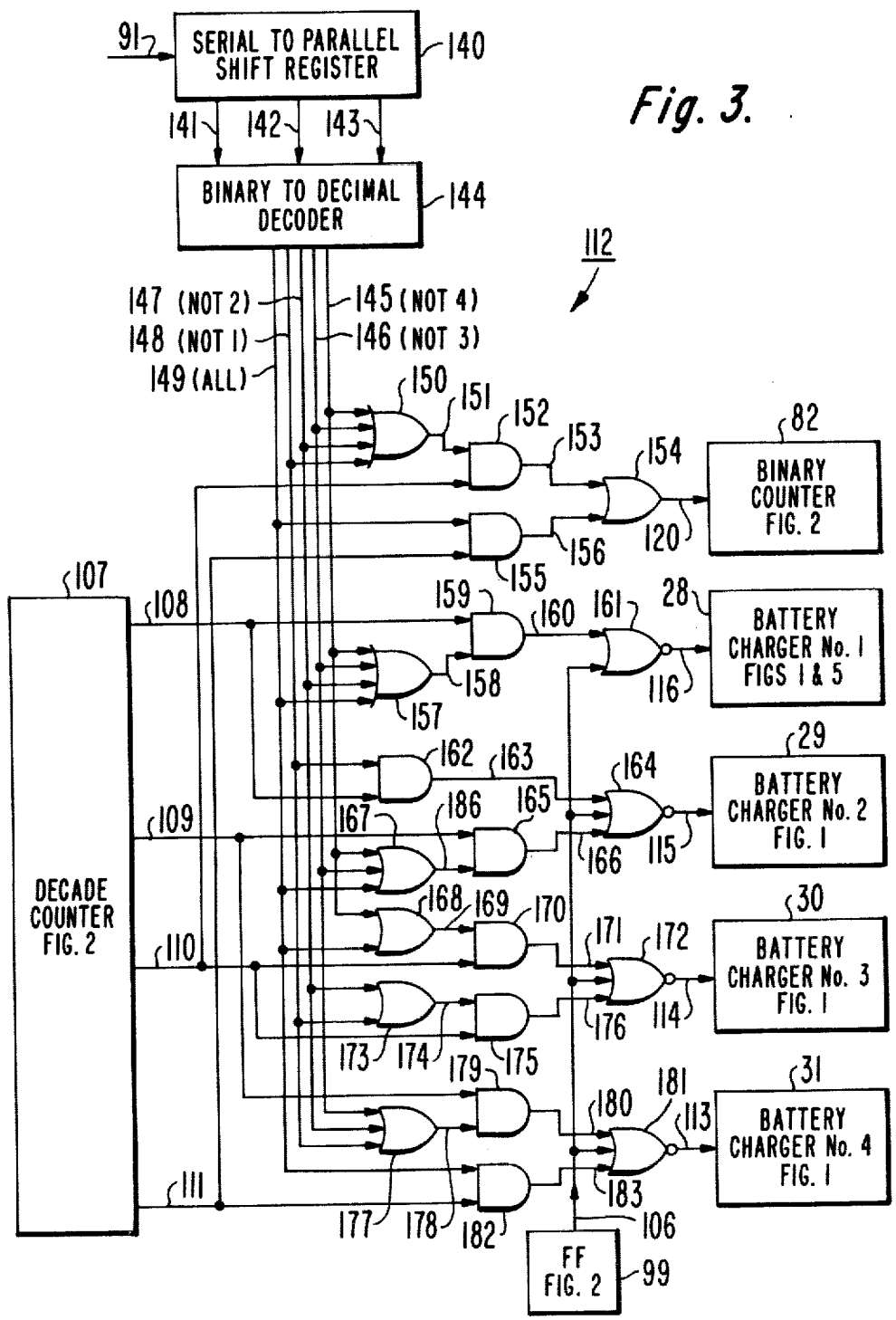
FIG. 3 is a block diagram of the mode control logic shown in FIG. 2.

Reference is now made to FIG. 3 which shows the details of mode control logic 112. The mode select signal on path 91 is applied to a serial-to-parallel shift register 140 of mode control logic 112. Shift register 140 is for example, comprised of a type CD4015A followed by a type CD4035A, both supplied by RCA Corporation. Shift register 140 converts serial data on path 91 to three bits of binary information which are separately provided on parallel signal paths 141, 142, and 143. A binary-to-decimal decoder 144 converts the binary information on signal paths 141, 142, and 143 to provide an output on one of the paths 145 (NOT4), 146 (NOT3), 147 (NOT2), and 148 (NOT1) and 149 (ALL). Decoder 144 is typically a type CD4028A supplied by RCA Corporation. The presence of an output on one of the paths 145, 146, 147, 148, and 149, in combination with the output pulses from decade counter 107 on paths 108, 109, 110, and 111 generates a pulse once every 15 or 20 minutes on path 120 and the control signal for the activation or non-activation of one of the chargers 28, 29, 30, and 31. The information (NOT4-NOT3-NOT2-NOT1-ALL present) on paths 145 through 149 supplied from the decoder 90 determines if either three of the four batteries 47, 46, 45, or 44 or all the batteries 44–47, respectively are to be charged. The logic elements 150–182 are of conventional types, AND, OR's and NOR's are arranged as shown in FIG. 3 having nine input signals on paths 145, 146, 147, 148, 149, 108, 109, 110, 111, and 106 are combined for the generation of the five control signals on paths 120, 116, 115, 114 and 113.

The logic elements 150 (OR gate), 152 (AND gate), and 154 (OR gate), produce the 15 minute pulse on path 120 via OR gate 154. The logic element 155 (AND gate) produces the 20 minute pulse on path 120 via OR gate 154. If any of the functions NOT1, NOT2, NOT3, NOT4, signal is present, the 15 minute pulse is generated and AND gate 155 is disabled preventing the 20 minute pulse. Conversely, if none of the batteries is to be inhibited from charging, then AND gate 152 is disabled preventing the 15 minute pulse and AND gate 155 is characterized so when enabled the 20 minute pulse is provided. The remaining logic 157 thru 182, shown as arranged in FIG. 3, enable or inhibit each battery chargers 28, 29, 30 and 31 as determined by the digital information on paths 148, 147, 146, and 145 respectively. If any of the function NOT1 ... NOT4 is present then the associated charger is disabled. If all the battery chargers 28-31 are to be enabled, decoder 144 provides a signal on path 149 to prime paths 116, 115, 114, and 113 at AND gates 159, 165, 170 and 182. Conversely, if the manual mode signal is decoded as indicated by a signal on path 106 all of the battery chargers 28 thru 31 are disabled.

Figure 4:
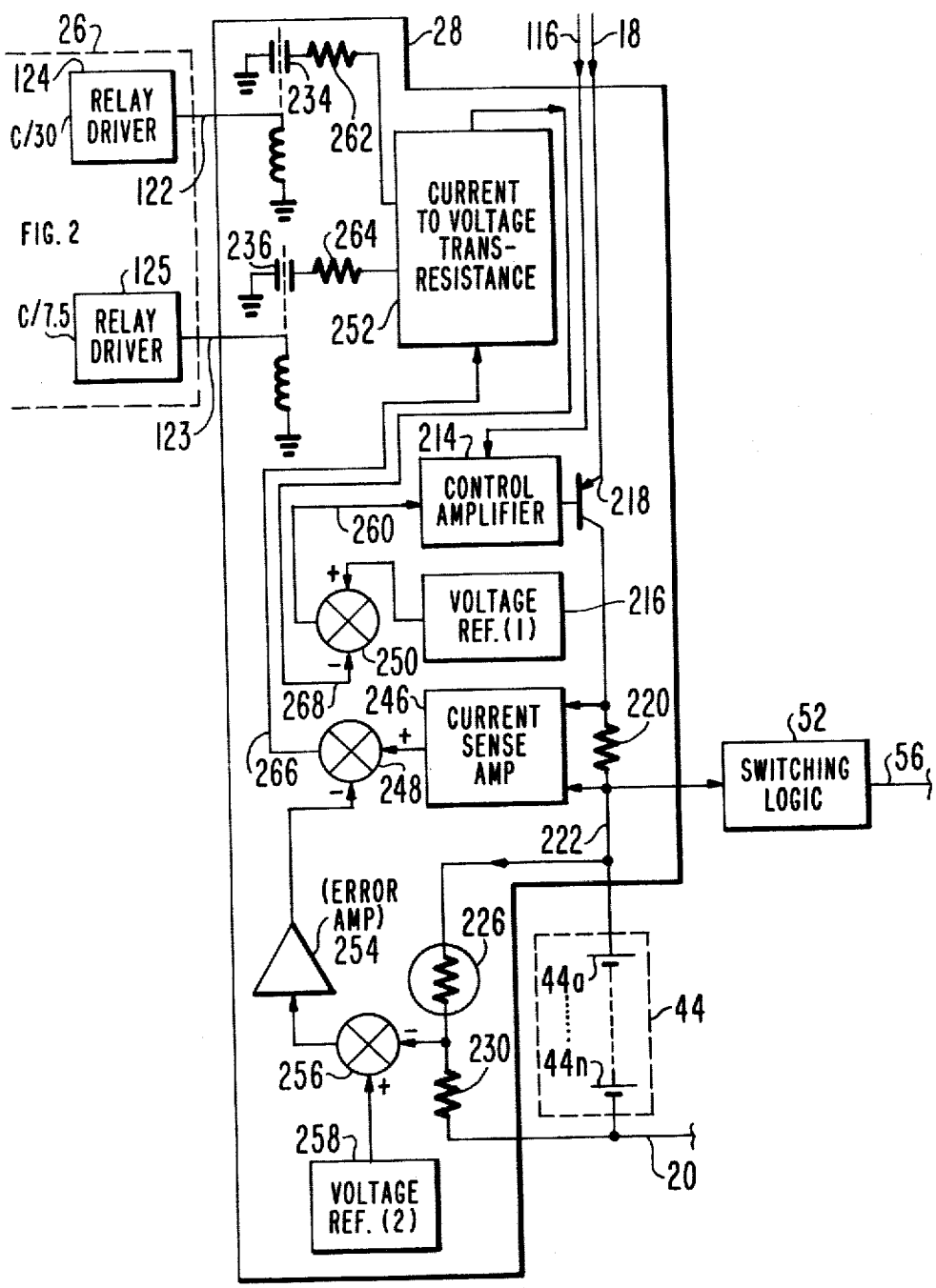
FIG. 4 is a block and schematic diagram of the battery charger of FIG. 2.

Reference is now made to FIG. 4 showing the circuitry within the battery charger 28 that controls the charging rate of battery 44. The battery charger 28 contains the circuitry used to control and regulate battery charging currents, to protect the battery from overcurrent, overvoltage, and overcharge. To perform these functions, the system parameters of battery charge current and battery voltage are sensed. These parameters are monitored continually and compared with preset references, voltage reference (1) 216 and voltage reference (2) 258, to provide the necessary control for battery charging.

The battery charger 28 operates in the current regulator mode during the beginning of the recharge cycle with the current limited to either the C/7.5 or C/30 charge rates. As the battery reaches the full charge state, the voltage attains the predetermined level at which the charge rate is reduced and voltage regulation is maintained.

The current regulation is essentially achieved by control circuit formed by current sensing resistor 220, current-to-voltage transresistor 252, and voltage reference (1) 216. The voltage regulation is essentially achieved by a control circuit formed by thermistor 226, resistor 230, error amplifier 264 and voltage reference (2) 258.

The predetermined value for the current regulation is established by voltage reference (1) 216 typically set for the example 17 ampere-hour battery to a value of 5.0 volts. The predetermined value of voltage regulation is established by voltage reference (2) 258 typically set to a value of 12.0 volts. The rate of charging, that is C/7.5 or C/30 is established by resistors 264 and 262, respectively, operating with current-to-voltage transresistance 252.

The amplifier 214 is arranged to be rendered operative on the removal of the positive voltage on signal path 116 previously discussed. The amplifier 214 generates a forward bias volage to the base of transistor 218. Transistor 218 controls the amount of the forward current from the solar array 10, shown in FIG. 1, to be conducted to the battery 44 via resistor 220 and signal path 222. The forward current for charging battery 44 is sensed by resistor 220 which is connected to the input of current sense amplifier 246. The output of amplifier 246 is connected to a summing point 248. At summing point 248 the output of amplifier 246 is compared to the output of error amplifier 254. The output of error amplifier 254 is controlled by the voltage reference (2) 258 via summing point 256. Voltage reference (2) 258 renders error amplifier 254 inoperative until the voltage across battery as sensed by thermistor 226 and resistor 230 equals or exceeds the predetermined voltage (12 volts for example) established by voltage reference (2) 258. Thus, current sense amplifier 246 is the controlling element for current regulation until the voltage across battery 44 reaches the predetermined voltage whereby error amplifier 254 is rendered operative. The output of current sense amplifier 246, via summing point 248 and path 266, is applied to current-to-voltage transresistor 252. The output of current-to-voltage transresistance 252 is connected to a summing point via path 268. Summing point 250 compares the voltage level of current-to-voltage transresistor 252 with the 5.0 volt level of voltage reference (1) 216. The output from summing point 250 is a differential voltage determined by difference between current-to-voltage transresistance 252 output voltage and voltage reference (1) 216. The output voltage from current-to-voltage transresistance 252 is dependent upon whether resistor 262 or 264 is connected to its bias circuit. The connection resistor 262 and 264 is, in turn, determined by the selection by timer sequencer 26 of the C/30 or C/7.5 charge rate respectively. As previously discussed, timer sequencer 26 energizes either relay drivers 124 (C/30) or 125 (C/7.5) which, in turn, closes relay contacts 234 or 236 respectively. Relay contact 234 or 236 respectively connect a ground potential for resistors 262 or 264 to couple one or the other resistors 262 or 264 to the current-to-voltage transresistance 252 to thereby establish the C/30 or C/7.5 charge rate.

When the voltage across battery 44, as measured by thermistor 226 and resistor 230 equals or exceeds the predetermined voltage established by voltage reference (2) 258, the current regulation of charger 28 is terminated and the voltage regulation of charger 28 is initiated. Resistor 230 in combination with thermistor 26 provide a voltage as a function of temperature of battery 44 indicative of the state of charge of battery 44. Accordingly, when the voltage as sensed by thermistor 226 and resistor 230 is in the order of the predetermined voltage, it is representative that the voltage of battery at the particular temperature at the time of measurement has met a predetermined requirement and thus battery 44 is completely charged. Control amplifier 214 responds to the predetermined voltage reached, via an input signal devloped by error amplifier 254, current-to-voltage transresistance 252, by rendering transistor 218 partially conductive, supplying a current to battery 44 sufficient to maintain the voltage at the predetermined value.

Figure 5:
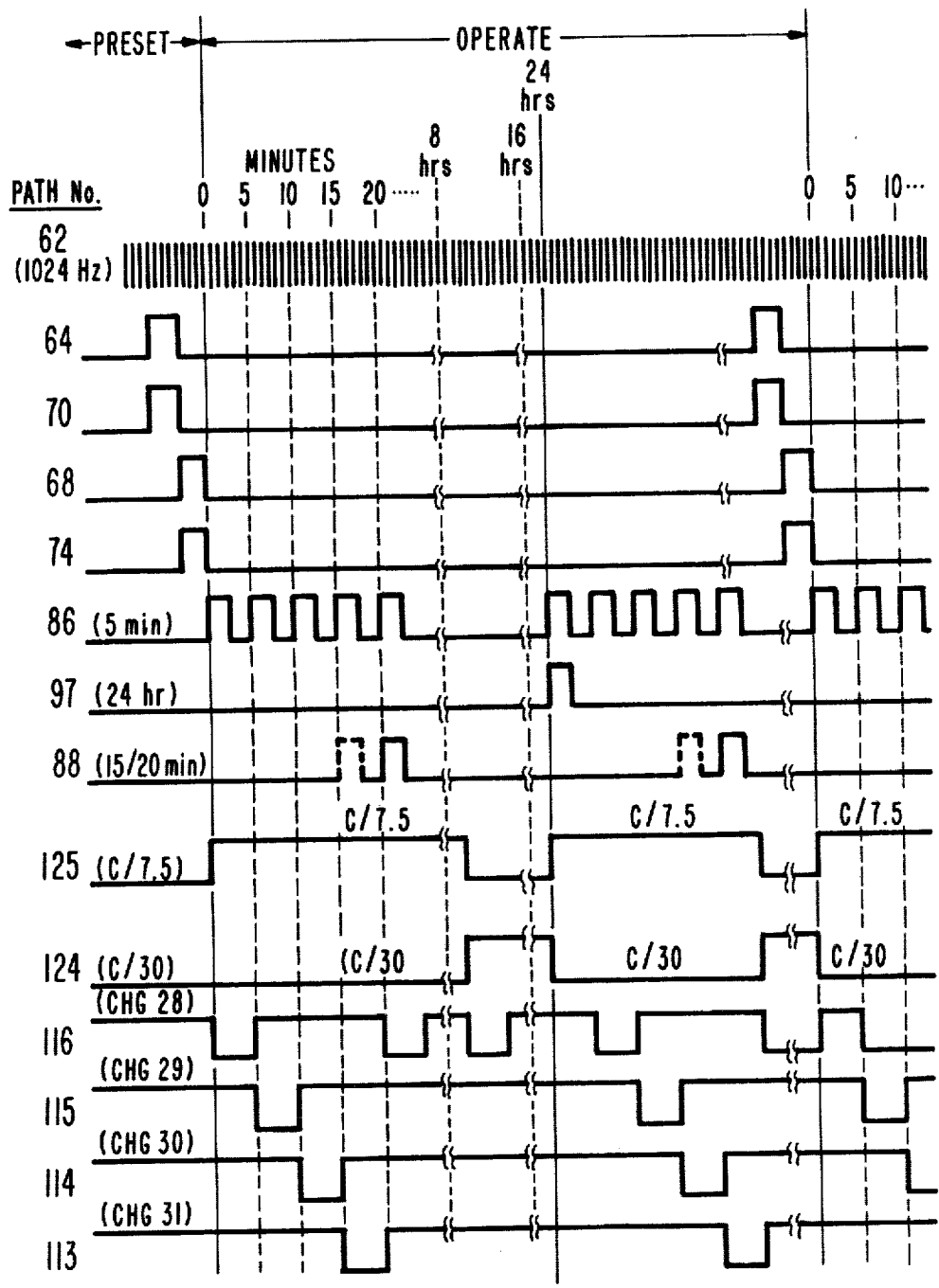
FIG. 5 is a timing diagram referred to in the explanation of the operation of a system embodying the invention.

Reference is now made to FIG. 5 to discuss the overall operation of the invention. FIG. 5 illustrates three modes of operation of the timer sequencer 26, (1) the preset mode, (2) the operate mode and (3) the restart mode.

In the preset mode the present values shown on paths 64 and 70 established from source 63 are read into timer sequencer 26. The preset values establish either a 15 or 20 minute duration for charging three or four batteries, respectively, and also establish when the charging rate C/7.5 or C/30 is used. In accordance with the previous description, the charging or four batteries 44, 45, 46, and 47 will be discussed. A 20 minute charging period will therefore be described. After the preset values have been stored in the timer sequencer 26, execute commands, shown on paths 68 and 74 are sent from the source 63 which may originate from a ground support station. The execute command resets the digital logic of a timer sequencer 26 and also places relay 125 in an energized state, thus establishing a charge rate of C/7.5 and places timer sequencer 26 in the operate mode.

In the operate mode, upon the occurrence of the first 5 minute pulse on path 86, inhibit signal on path 116 is inactivated, shown as a negative pulse, which allows battery charger 28 to charge battery 44 at a C/7.5 charge rate for a 5 minute duration. After the completion of the 5 minute duration, the signal on path 116, becomes a positive pulse to inhibit battery charger 28 and the inhibit signal 115 becomes inactive during the second 5 minute pulse allowing charger 29 to charge battery 45 at the C/7.5 charge rate for a 5 minute duration. Upon the occurrence of the third 5 minute pulse, the inhibit signal on path 115 is reactivated and inhibit signal on path 114 is inactivated thus causing charger 30 to charge battery 46 at a rate of C/7.5 for a 5 minute duration. Similarly, when the four 5 minute pulse occurs the inhibit signal on path 114 is reactivated and inhibit signal 113 is inactivated causing charger 31 to charge battery 47 at a charge rate of C/7.5 for a 5 minute duration. Upon the completion of fourth charger 31 charging battery 47, the decade counter 107 is reset by the divide by 4 or 3 programmable counter 87 and the sequence begins again with the first charger 28 charging battery 44. Upon the completion of the number of C/7.5 sequences preset in decoder 94, the preset quantity in counter comparator 103 is equal to the accumulated count of binary counter 82, thus causing counter comparator 103 to inactivate relay 125 and activate relay 124. The cycling of relays 125 and 124 changes the charge rate from C/7.5 to C/30. The above given operating sequence now repeats except that batteries 44, 45, 46, and 47 are sequentially charged every 5 minutes at a charge rate of C/30. It should be understood that battery chargers 28 thru 31 operate independently in the previously discussed current and voltage modes of regulation. The sequential charging of batteries 44, 45, 46 and 47 at the C/30 charge rate continues until the occurrence of the 24 hour pulse on signal path 97. The 24 hour pulse resets the digital logic of the timer sequencer, inactivates relay 124 and activates relay 125. The above given initial sequence of sequentially charging batteries 44–47 for a 5 minute duration at a charge rate of C/7.5 is now repeated. In this manner the sequence is automatically repeated daily. This is particularly useful for solar applications. Upon completion of the number of sequences preset in decoder 94, timer sequencer 26 selects the C/30 charge rate. Timer sequencer 26 being a digital device allows the charging of batteries to be interrupted and restored, the number of batteries charged varied, and the charging rates to be charged from C/7.5 to C/30 under control of external source. For example, execute commands on paths 68 and 74 transmitted from source 63 such as a ground station interrupts and restarts the battery charging, supply a digital preset value for a 15 minute pulse instead of a 20 minute marker pulse allows the charging of three instead of four batteries.

The invention having the timer sequencer 26 permits the charging of each battery in sequence for a predetermined time with a varying charging current, i.e., C/7.5 or C/30. The battery chargers 28, 29, 30 and 31 first charge each battery with a relatively high charge rate of for example, C/7.5 (a charging current of 2.27 ampere for a 17 ampere-hour battery) and then charge each battery with a relatively low charge rate of C/30 (a charging current of 0.567 amperes). The relative low charge rate of C/30 reduces the heat dissipation in the batteries as the batteries approach the fully charged state. As discussed previously, the heat dissipation possible with the prior art C/20 charging rate may be in the order of 112 watts. Using the C/30 charging rate, at the approximate time the batteries are near full charge, the possible heat dissipation is reduced to approximately 20 watts which reduces the possible temperature increase in the battery thus prolonging the life of the battery. Furthermore, the predetermined incremental charging time, e.g., 5 minutes is selected to allow the state of charge of each of the four batteries 44–47 to increase approximately equally. If a need to supply power to the satellite load occurs before the battery charging is completed, the equal state of charge of each battery allows each battery to discharge equally into the satellite load. Still, further the total power consumed for charging four batteries with the sequential charging rate of C/7.5 and C/30 is 75 watts which is a saving of 37 watts or 33% when compared to prior art system having a charge rate of C/30 requiring 112 watts to charge four batteries.

What is claimed is:

1. A system for charging a plurality of batteries from a power source, comprising:
   means for sensing the ampere-hour discharge of said batteries and producing a control signal indicative of such discharge;
   charging means coupled to said power source and responsive to said control signal for producing a relatively high charging current during a first time period proportional to the value of said control signal and for then producing a relatively low charging current; and
   means coupled to said charging means and said batteries for applying said charging currents to each of said batteries in sequence for a relatively short fixed time period to partially charge said batteries and for continuously repeating the sequence of applying said charging currents to charge up all of said batteries until said batteries are fully charged or said power source is interrupted.

2. A system for adaptively charging a plurality of batteries according to a first signal representing the batteries to be charged and a second signal representing the time duration said batteries are to be charged at a given charge rate, said system comprising:
   a plurality of battery chargers each coupled to a different one of said batteries;
   means coupled to said battery chargers and responsive to said first signal for sequentially and cyclically enabling the battery chargers coupled to said selected batteries for a relatively short first time period;
   each of said battery chargers when enabled responsive to a first control signal for charging said battery coupled thereto at said given charge rate and responsive to a second control signal for charging said battery coupled thereto at a lower charge rate;
   means responsive to said second signal for providing a reference signal representing a given count number; and
   means coupled to said sequencing and cyclically enabling means and responsive to the number of cycles said battery chargers are enabled and responsive to said reference signal for providing said first control signal to said chargers until the number of cycles equals said given count number and for thereafter providing said second control signal to said battery chargers.

3. The combination of claim 2 wherein said given charge rate is at least C/10, where C is the battery capacity in ampere-hours.

* * * * *